US010281942B2

(12) United States Patent
Siao et al.

(10) Patent No.: US 10,281,942 B2
(45) **Date of Patent: *May 7, 2019**

(54) LOW-DROPOUT REGULATOR

(71) Applicant: TAIWAN SEMICONDUCTOR MANUFACTURING COMPANY LIMITED, Hsin-Chu (TW)

(72) Inventors: Yuan-Long Siao, Kaohsiung (TW); Ku-Feng Lin, New Taipei (TW); Kai-Chun Lin, Hsinchu (TW); Hung-Chang Yu, Hsin-Chu (TW); Chia-Fu Lee, Hsinchu (TW); Yue-Der Chih, Hsin-Chu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 11 days.

This patent is subject to a terminal disclaimer.

(21) Appl. No.: 15/904,536

(22) Filed: Feb. 26, 2018

(65) Prior Publication Data

US 2018/0188756 A1 Jul. 5, 2018

Related U.S. Application Data

(62) Division of application No. 14/181,848, filed on Feb. 17, 2014, now Pat. No. 9,910,451.

(51) Int. Cl.

| | |
|---|---|
| ***G05F 1/575*** | (2006.01) |
| ***G05F 1/46*** | (2006.01) |
| *H02M 3/07* | (2006.01) |
| *G05F 1/563* | (2006.01) |
| *H02M 1/00* | (2006.01) |

(52) U.S. Cl.
CPC .............. *G05F 1/575* (2013.01); *G05F 1/461* (2013.01); *G05F 1/563* (2013.01); *H02M 3/07* (2013.01); *H02M 2001/0045* (2013.01)

(58) Field of Classification Search
CPC ..... H02M 2003/072; H02M 2003/075; H02M 2003/076; H02M 2003/077; H02M 2003/078; H02M 2003/071; H02M 3/07; H02M 3/073; G11C 5/145
USPC ....... 323/270, 271, 272, 273, 274, 275, 279, 323/280
See application file for complete search history.

(56) References Cited

U.S. PATENT DOCUMENTS 8,692,529 B1 * 4/2014 Wyatt ........................ G05F 1/56 323/270
2013/0285705 A1 * 10/2013 Kabir ..................... G11C 27/02 327/94

* cited by examiner

*Primary Examiner* — Bryan R Perez
(74) *Attorney, Agent, or Firm* — Cooper Legal Group, LLC

(57) ABSTRACT

A low-dropout (LDO) regulator is provided. The LDO regulator comprises a first circuit operating as a closed loop control system. The first circuit is configured to control a voltage at a first node such that the voltage at the first node is substantially equal to a specified regulator output voltage. The LDO regulator comprises a second circuit operating as an open loop control system. The second circuit is configured to increase the voltage at the first node when a current flowing through a load changes from a first current to a second current. The first current is substantially equal to 0 amperes.

20 Claims, 7 Drawing Sheets

102
402
204
404
202
112
302
104
106
108
304
306
Load
308
110
110
310

LOW-DROPOUT REGULATOR

RELATED APPLICATION

This application is a divisional of and claims priority to U.S. patent application Ser. No. 14/181,848, titled "LOW-DROPOUT REGULATOR" and filed on Feb. 17, 2014, which is incorporated herein by reference.

BACKGROUND

A low-dropout (LDO) regulator is a linear voltage regulator. An LDO regulator is used to control a voltage at a node. LDO regulators are used in flash memory devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
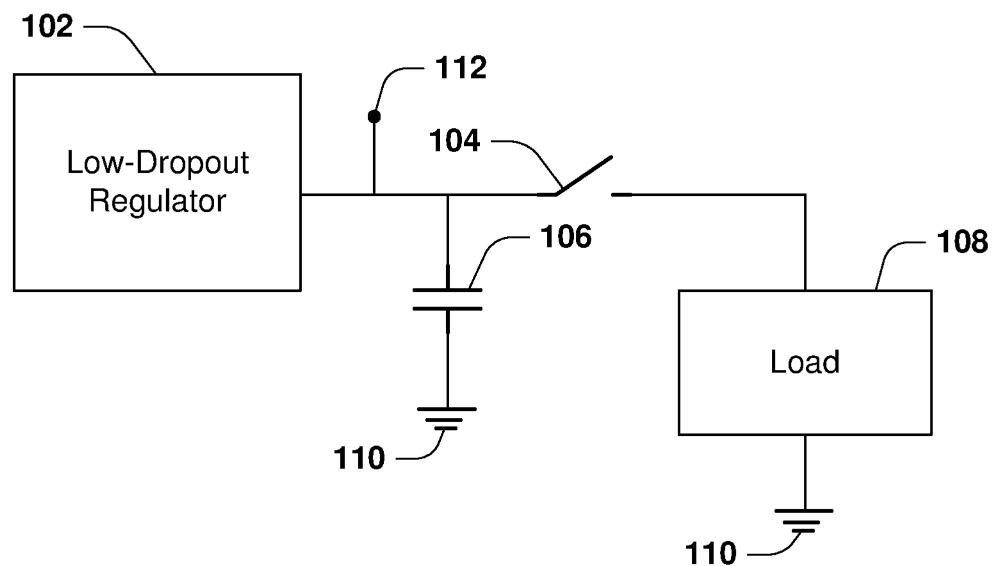
FIG. 1 is an illustration of a circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

According to some embodiments, a low-dropout (LDO) regulator is provided. In some embodiments, the LDO regulator is connected to a flash memory device. In some embodiments, the LDO regulator is comprised within an integrated circuit (IC).

FIG. 1 illustrates an LDO regulator 102, a first capacitor 106, a first switch 104, a load 108, a first node 112 and a first voltage source 110. In some embodiments, the LDO regulator 102 is connected to the first node 112. In some embodiments, the first node 112 is connected to a first side of the first capacitor 106. In some embodiments, a second side of the first capacitor 106 is connected to the first voltage source 110. In some embodiments, the first side of the first capacitor 106 is connected to a first side of the first switch 104. In some embodiments, a second side of the first switch 104 is connected to the load 108. In some embodiments, the load 108 is connected to the first voltage source 110. In some embodiments, the first switch 104 comprises one or more transistors. In some embodiments, the first voltage source 110 is ground. In some embodiments, the load 108 is a circuit.

In some embodiments, the LDO regulator 102 is configured to control a voltage at the first node 112. In some embodiments, the LDO regulator 102 is configured to apply a specified regulator output voltage on the first node 112. In some embodiments, when the voltage at the first node 112 exceeds the specified regulator output voltage, the LDO regulator 102 is configured to decrease the voltage at the first node 112 until the voltage at the first node 112 is substantially equal to the specified regulator output voltage. In some embodiments, when the voltage at the first node 112 decreases below the specified regulator output voltage, the LDO regulator 102 is configured to increase the voltage at the first node 112 until the voltage at the first node 112 is substantially equal to the specified regulator output voltage.

In some embodiments, the first switch 104 is activated for a period of time. In some embodiments, a first current passes through the first switch 104 and through the load 108 when the first switch 104 is deactivated. In some embodiments, a second current passes through the first switch 104 and through the load 108 when the first switch 104 is activated. In some embodiments, the second current is greater than the first current. In some embodiments, the first current is substantially equal to 0 amperes. In some embodiments, at a moment when the first switch 104 changes from a state of deactivation to a state of activation, the voltage at the first node 112 decreases. In some embodiments, the LDO regulator 102 is configured to increase the voltage at the first node 112 after the first switch 104 changes from the state of deactivation to the state of activation, until the voltage at the first node 112 is substantially equal to the specified regulator output voltage. In some embodiments, the first switch 104 is deactivated for a period of time. In some embodiments, at a moment when the first switch 104 changes from the state of activation to the state of deactivation, the voltage at the first node 112 increases. In some embodiments, the LDO regulator 102 is configured to decrease the voltage at the first node 112 after the first switch 104 changes from the state of activation to the state of deactivation, until the voltage at the first node 112 is substantially equal to the specified regulator output voltage.

Figure 2:
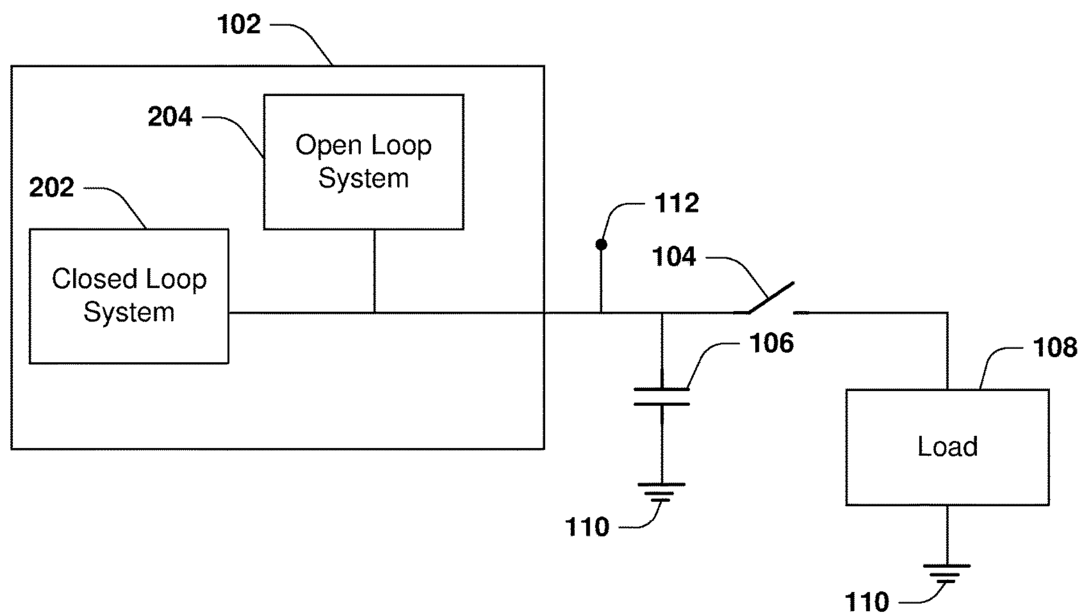
FIG. 2 is an illustration of a circuit, in accordance with some embodiments.

FIG. 2 illustrates the LDO regulator 102, the first capacitor 106, the first switch 104, the load 108, the first node 112 and the first voltage source 110. In some embodiments, the LDO regulator 102 is connected to the first node 112. In some embodiments, the first node 112 is connected to the first side of the first capacitor 106. In some embodiments, the second side of the first capacitor 106 is connected to the first voltage source 110. In some embodiments, the first side of the first capacitor 106 is connected to the first side of the first switch 104. In some embodiments, the second side of the first switch 104 is connected to the load 108. In some embodiments, the load 108 is connected to the first voltage source 110.

In some embodiments, the LDO regulator 102 comprises a first circuit 202 and a second circuit 204. In some embodiments, the first circuit 202 is connected to the second circuit 204. In some embodiments, the first circuit 202 is connected to the first node 112. In some embodiments, the second circuit 204 is connected to the first node 112. In some embodiments, the first circuit 202 operates as a closed loop control system. In some embodiments, the second circuit 204 operates as an open loop control system. In some embodiments, the first circuit 202 is a voltage regulator with a push-pull configuration. In some embodiments, the first circuit 202 is configured to increase the voltage at the first node 112 when the voltage at the first node 112 is below the specified regulator output voltage until the voltage at the first node 112 is substantially equal to the specified regulator output voltage. In some embodiments, the first circuit 202 is configured to decrease the voltage at the first node 112 when the voltage at the first node 112 is above the specified regulator output voltage until the voltage at the first node 112 is substantially equal to the specified regulator output voltage.

In some embodiments, the second circuit 204 is configured to increase the voltage at the first node 112, when the current through the load 108 changes from the first current to the second current, for a period of time. In some embodiments, the second circuit 204 is configured to increase the voltage at the first node 112, after the first switch 104 changes from the state of deactivation to the state of activation, for the period of time. In some embodiments, the second circuit 204 is configured to increase the voltage at the first node 112, when the voltage at the first node 112 decreases below a first specified voltage, for the period of time. In some embodiments, the first specified voltage is below the specified regulator output voltage. In some embodiments, the first specified voltage is substantially equal to the specified regulator output voltage.

Figure 3:
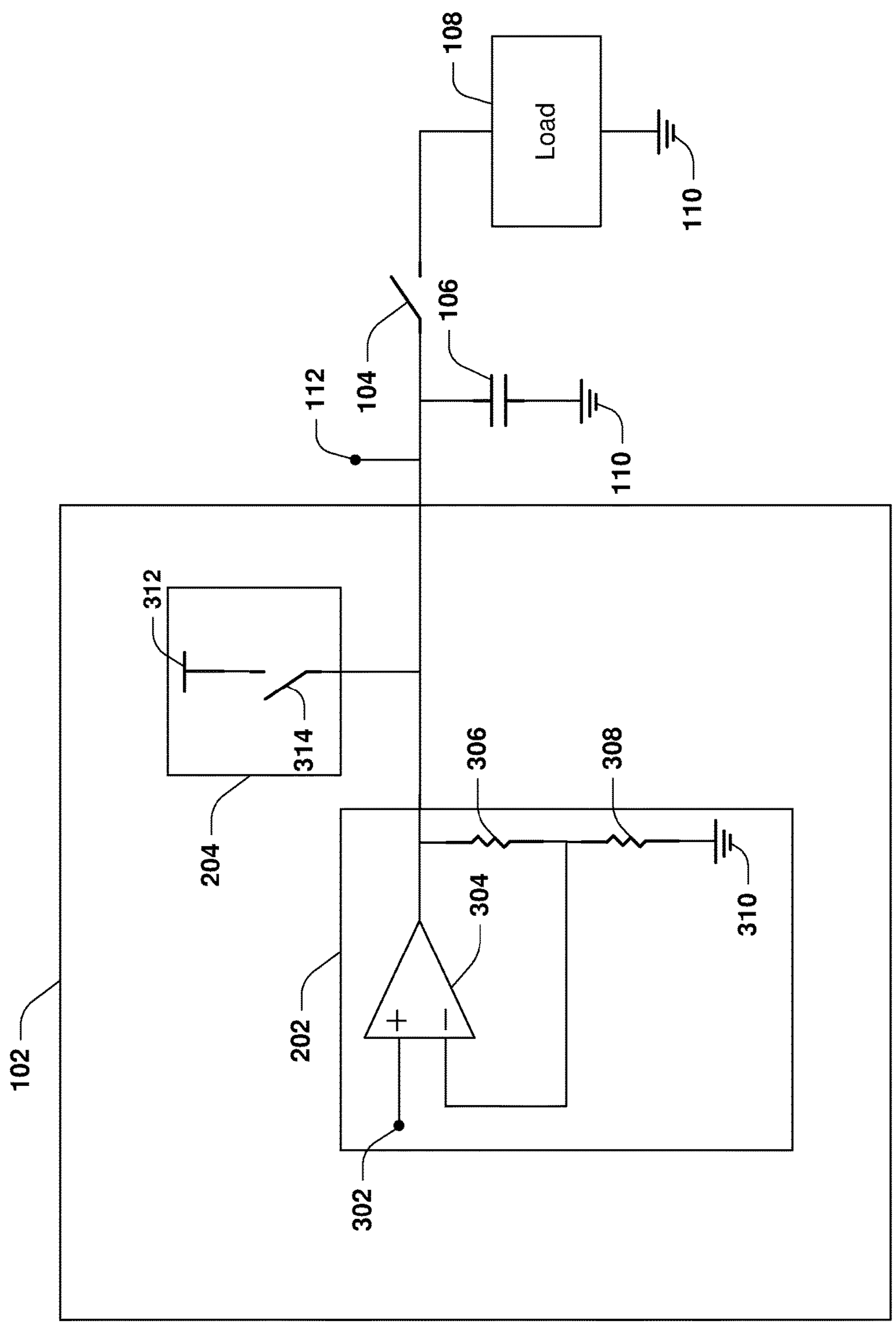
FIG. 3 is an illustration of a circuit, in accordance with some embodiments.

FIG. 3 illustrates the LDO regulator 102, the first capacitor 106, the first switch 104, the load 108, the first node 112 and the first voltage source 110. In some embodiments, the LDO regulator 102 is connected to the first node 112. In some embodiments, the first node 112 is connected to the first side of the first capacitor 106. In some embodiments, the second side of the first capacitor 106 is connected to the first voltage source 110. In some embodiments, the first side of the first capacitor 106 is connected to the first side of the first switch 104. In some embodiments, the second side of the first switch 104 is connected to the load 108. In some embodiments, the load 108 is connected to the first voltage source 110.

In some embodiments, the LDO regulator 102 comprises the first circuit 202. In some embodiments, the first circuit 202 comprises a second node 302, an operational amplifier 304, a first resistor 306 and a second resistor 308. In some embodiments, the second node 302 is connected to a non-inverting input of the operational amplifier 304. In some embodiments, an output of the operational amplifier 304 is connected to a first side of the first resistor 306. In some embodiments, a second side of the first resistor 306 is connected to an inverting input of the operational amplifier 304. In some embodiments, the second side of the first resistor 306 is connected to a first side of the second resistor 308. In some embodiments, a second side of the second resistor 308 is connected to a second voltage source 310. In some embodiments, a voltage of the second voltage source 310 is substantially equal to a voltage of the first voltage source 110. In some embodiments, the second voltage source 310 is ground.

In some embodiments, a voltage at the second node 302 is a reference voltage. In some embodiments, the specified regulator output voltage is a function of the reference voltage. In some embodiments, the specified regulator output voltage is a function of a first resistance of the first resistor 306. In some embodiments, the specified regulator output voltage is a function of a second resistance of the second resistor 308. In some embodiments, the specified regulator output voltage is substantially equal to a sum of the first resistance and the second resistance, divided by the second resistance, multiplied by the reference voltage.

In some embodiments, the LDO regulator 102 comprises the second circuit 204. In some embodiments, the second circuit 204 comprises a third voltage source 312 and a second switch 314. In some embodiments, the third voltage source 312 is connected to a first side of the second switch 314. In some embodiments, a second side of the second switch 314 is connected to the first node 112. In some embodiments, a voltage of the third voltage source 312 is substantially equal to a voltage of a supply voltage provided by a power supply operably connected to the third voltage source 312. In some embodiments, the voltage of the third voltage source 312 is substantially equal to the specified regulator output voltage. In some embodiments, the second switch 314 comprises one or more transistors. In some embodiments, the second switch 314 is controlled by a first control signal. In some embodiments, the first control signal is controlled by a signal generator. In some embodiments, the second switch 314 is configured to be activated, when the current through the load 108 changes from the first current to the second current, for a period of time. In some embodiments, the second switch 314 is configured to be activated, after the first switch 104 changes from the state of deactivation to the state of activation, for the period of time. In some embodiments, the second switch 314 is configured to be activated, when the voltage at the first node 112 decreases below the first specified voltage, for the period of time. In some embodiments, the third voltage source 312 is connected to the first node 112 when the second switch 314 is activated. In some embodiments, the period of time is configured such that the voltage at the first node 112 does not exceed the specified regulator output voltage. In some embodiments, the period of time is less than 10 nanoseconds. In some embodiments, the period of time is configured such that the voltage at the first node 112 exceeds the specified regulator output voltage. In some embodiments, the first circuit 202 is configured to decrease the voltage at the first node 112 when the voltage at the first node 112 exceeds the specified regulator output voltage.

Figure 4:
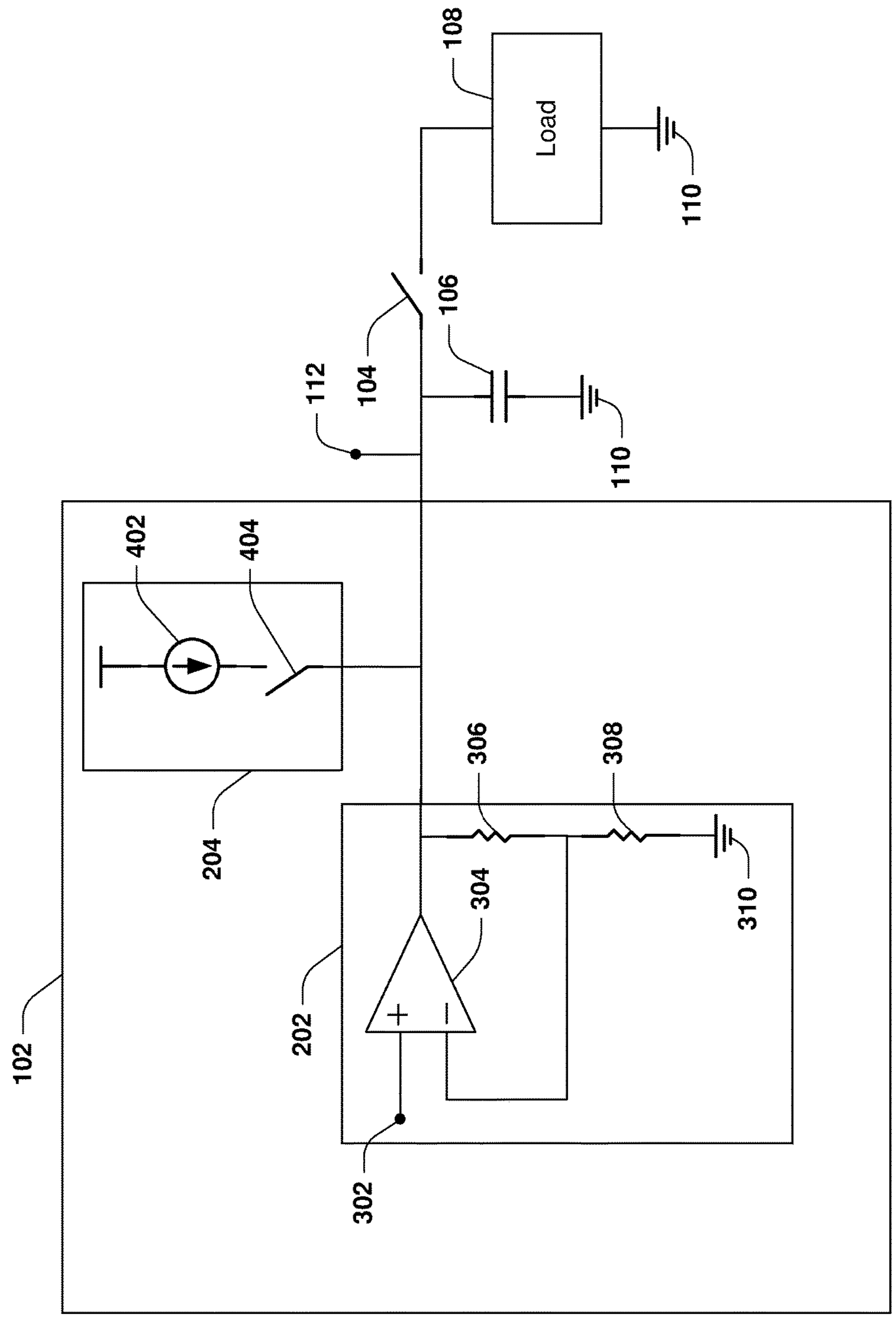
FIG. 4 is an illustration of a circuit, in accordance with some embodiments.

FIG. 4 illustrates the LDO regulator 102, the first capacitor 106, the first switch 104, the load 108, the first node 112 and the first voltage source 110. In some embodiments, the LDO regulator 102 is connected to the first node 112. In some embodiments, the first node 112 is connected to the first side of the first capacitor 106. In some embodiments, the second side of the first capacitor 106 is connected to the first voltage source 110. In some embodiments, the first side of the first capacitor 106 is connected to the first side of the first switch 104. In some embodiments, the second side of the first switch 104 is connected to the load 108. In some embodiments, the load 108 is connected to the first voltage source 110.

In some embodiments, the LDO regulator 102 comprises the first circuit 202. In some embodiments, the first circuit 202 comprises the second node 302, the operational amplifier 304, the first resistor 306 and the second resistor 308. In some embodiments, the second node 302 is connected to the non-inverting input of the operational amplifier 304. In some embodiments, the output of the operational amplifier 304 is connected to the first side of the first resistor 306. In some embodiments, the second side of the first resistor 306 is connected to the inverting input of the operational amplifier 304. In some embodiments, the second side of the first resistor 306 is connected to the first side of the second resistor 308. In some embodiments, the second side of the second resistor 308 is connected to the second voltage source 310.

In some embodiments, the LDO regulator 102 comprises the second circuit 204. In some embodiments, the second circuit 204 comprises a first current source 402 and a third switch 404. In some embodiments, the first current source 402 is a constant current source. In some embodiments, the first current source 402 is connected to a first side of the third switch 404. In some embodiments, a second side of the third switch 404 is connected to the first node 112. In some embodiments, the third switch 404 comprises one or more transistors. In some embodiments, the third switch 404 is controlled by a second control signal. In some embodiments, the second control signal is controlled by a signal generator. In some embodiments, the third switch 404 is configured to be activated, when the current through the load 108 changes from the first current to the second current, for a period of time. In some embodiments, the third switch 404 is configured to be activated, after the first switch 104 changes from the state of deactivation to the state of activation, for the period of time. In some embodiments, the third switch 404 is configured to be activated, when the voltage at the first node 112 decreases below the first specified voltage, for the period of time. In some embodiments, the first current source 402 is connected to the first node 112 when the third switch 404 is activated. In some embodiments, the period of time is configured such that the voltage at the first node 112 does not exceed the specified regulator output voltage. In some embodiments, the period of time is less than 10 nanoseconds. In some embodiments, the period of time is configured such that the voltage at the first node 112 exceeds the specified regulator output voltage. In some embodiments, the first circuit 202 is configured to decrease the voltage at the first node 112 when the voltage at the first node 112 exceeds the specified regulator output voltage.

Figure 5:
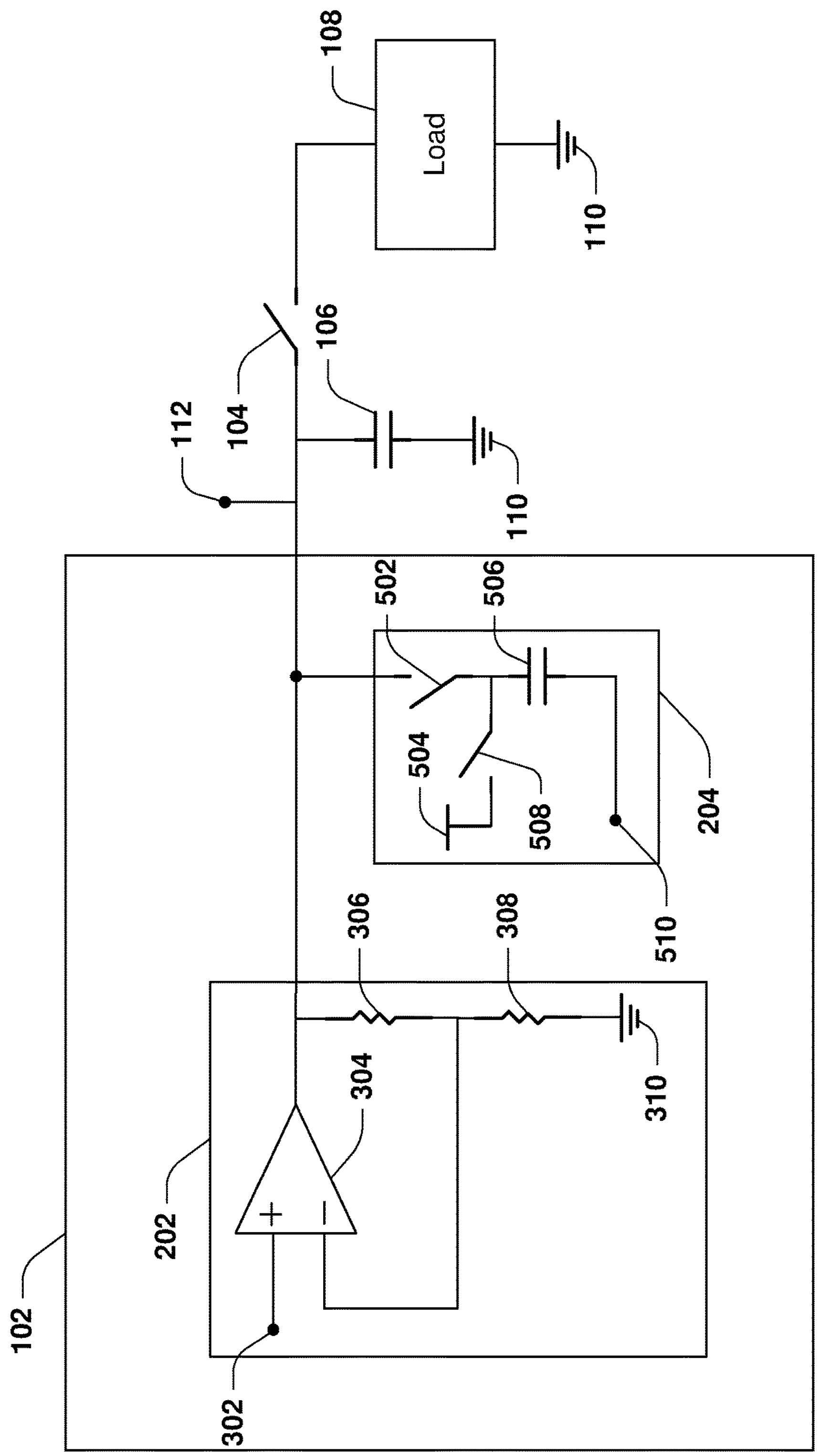
FIG. 5 is an illustration of a circuit, in accordance with some embodiments.

FIG. 5 illustrates the LDO regulator 102, the first capacitor 106, the first switch 104, the load 108, the first node 112 and the first voltage source 110. In some embodiments, the LDO regulator 102 is connected to the first node 112. In some embodiments, the first node 112 is connected to the first side of the first capacitor 106. In some embodiments, the second side of the first capacitor 106 is connected to the first voltage source 110. In some embodiments, the first side of the first capacitor 106 is connected to the first side of the first switch 104. In some embodiments, the second side of the first switch 104 is connected to the load 108. In some embodiments, the load 108 is connected to the first voltage source 110.

In some embodiments, the LDO regulator 102 comprises the first circuit 202. In some embodiments, the first circuit 202 comprises the second node 302, the operational amplifier 304, the first resistor 306 and the second resistor 308. In some embodiments, the second node 302 is connected to the non-inverting input of the operational amplifier 304. In some embodiments, the output of the operational amplifier 304 is connected to the first side of the first resistor 306. In some embodiments, the second side of the first resistor 306 is connected to the inverting input of the operational amplifier 304. In some embodiments, the second side of the first resistor 306 is connected to the first side of the second resistor 308. In some embodiments, the second side of the second resistor 308 is connected to the second voltage source 310.

In some embodiments, the LDO regulator 102 comprises the second circuit 204. In some embodiments, the second circuit 204 comprises a fourth switch 502, a fifth switch 508, a second capacitor 506, a fourth voltage source 504 and a third node 510. In some embodiments, a first side of the fourth switch 502 is connected to the first node 112. In some embodiments, a second side of the fourth switch 502 is connected to a first side of the fifth switch 508. In some embodiments, a second side of the fifth switch 508 is connected to the fourth voltage source 504. In some embodiments, the first side of the fifth switch 508 is connected to a first side of the second capacitor 506. In some embodiments, a second side of the second capacitor 506 is connected to the third node 510. In some embodiments, a voltage of the fourth voltage source 504 is substantially equal to a voltage of a supply voltage provided by a power supply operably connected to the fourth voltage source 504. In some embodiments, the voltage of the fourth voltage source 504 is substantially equal to the specified regulator output voltage. In some embodiments, the fourth switch 502 comprises one or more transistors. In some embodiments, the fifth switch 508 comprises one or more transistors. In some embodiments, the fourth switch 502 is controlled by a third control signal. In some embodiments, the fifth switch 508 is controlled by a fourth control signal. In some embodiments, a fifth control signal exists at the third node 510. In some embodiments, the third control signal is controlled by a signal generator. In some embodiments, the fourth control signal is controlled by a signal generator. In some embodiments, the fifth control signal is controlled by a signal generator. In some embodiments, the fifth switch 508 is configured to be activated when the first switch 104 is deactivated. In some embodiments, the fourth voltage source 504 is connected to the first side of the second capacitor 506 when the fifth switch 508 is activated. In some embodiments, when the second capacitor 506 is not fully charged, the second capacitor 506 is configured to be in a charging state until the second capacitor 506 is fully charged, when the fifth switch 508 is activated. In some embodiments, the fourth switch 502 is configured to be activated when the fifth switch 508 is deactivated. In some embodiments, the fourth switch 502 is configured to be deactivated when the fifth switch 508 is activated. In some embodiments, when the fourth switch 502 is activated, the first node 112 is connected to the first side of the second capacitor 506. In some embodiments, the fifth control signal has a first voltage when the fourth switch 502 is activated. In some embodiments, the fifth control signal has a second voltage when the fourth switch 502 is deactivated. In some embodiments, the first voltage is greater than the second voltage. In some embodiments, the second voltage is substantially equal to 0 volts. In some embodiments, the first voltage is substantially equal to the voltage of the fourth voltage source 504. In some embodiments, the fourth switch 502 is configured to be activated, when the current through the load 108 changes from the first current to the second current, for a period of time. In some embodiments, the fourth switch 502 is configured to be activated, after the first switch 104 changes from the state of deactivation to the state of activation, for the period of time. In some embodiments, the fourth switch 502 is configured to be activated, when the voltage at the first node 112 decreases below the first specified voltage, for the period of time. In some embodiments, the period of time is configured such that the voltage at the first node 112 does not exceed the specified regulator output voltage. In some embodiments, the period of time is less than 10 nanoseconds. In some embodiments, the period of time is configured such that the voltage at the first node 112 exceeds the specified regulator output voltage. In some embodiments, the first circuit 202 is configured to decrease the voltage at the first node 112 when the voltage at the first node 112 exceeds the specified regulator output voltage.

Figure 6:
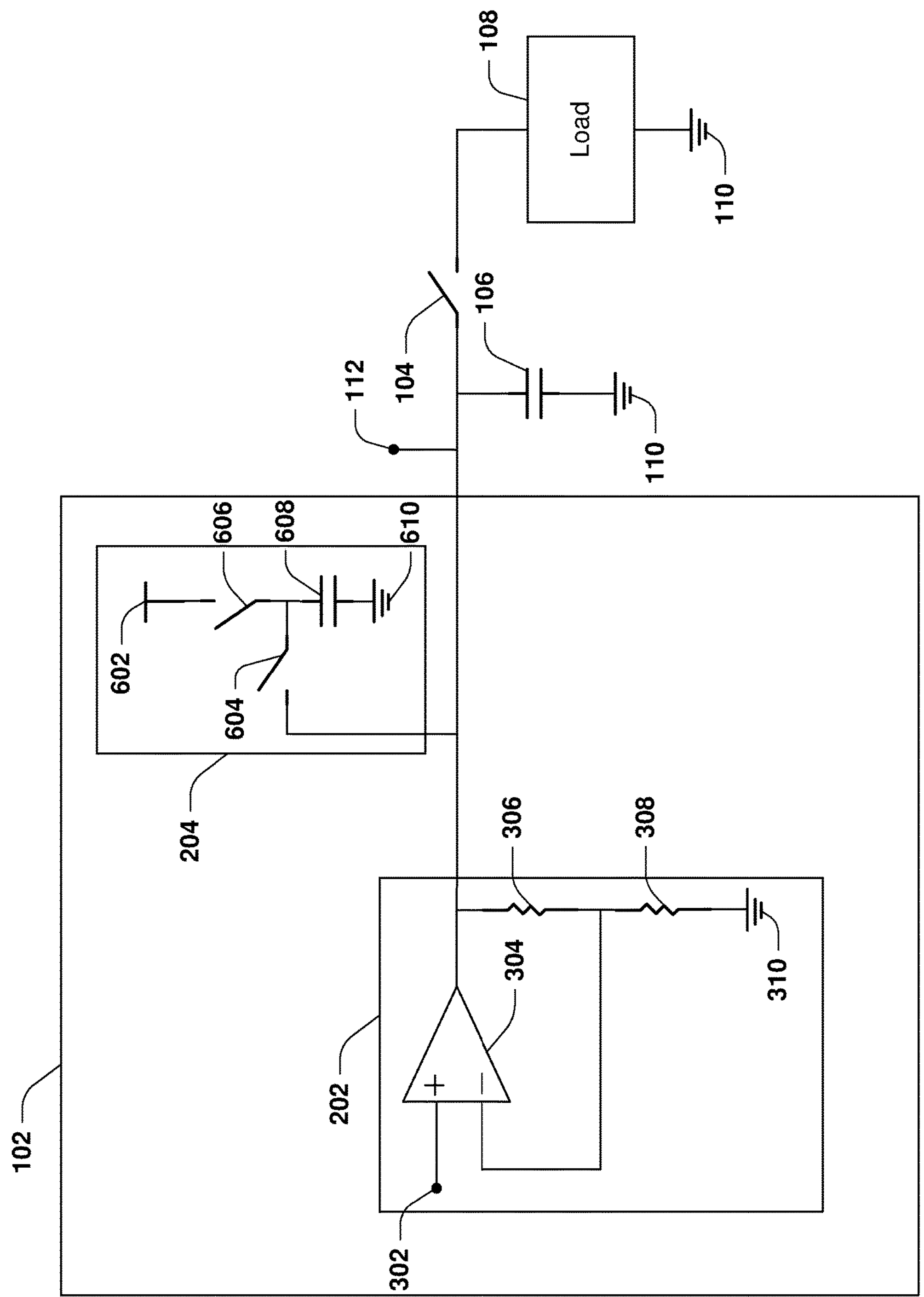
FIG. 6 is an illustration of a circuit, in accordance with some embodiments.

FIG. 6 illustrates the LDO regulator 102, the first capacitor 106, the first switch 104, the load 108, the first node 112 and the first voltage source 110. In some embodiments, the LDO regulator 102 is connected to the first node 112. In some embodiments, the first node 112 is connected to the first side of the first capacitor 106. In some embodiments, the second side of the first capacitor 106 is connected to the first voltage source 110. In some embodiments, the first side of the first capacitor 106 is connected to the first side of the first switch 104. In some embodiments, the second side of the first switch 104 is connected to the load 108. In some embodiments, the load 108 is connected to the first voltage source 110.

In some embodiments, the LDO regulator 102 comprises the first circuit 202. In some embodiments, the first circuit 202 comprises the second node 302, the operational amplifier 304, the first resistor 306 and the second resistor 308. In some embodiments, the second node 302 is connected to the non-inverting input of the operational amplifier 304. In some embodiments, the output of the operational amplifier 304 is connected to the first side of the first resistor 306. In some embodiments, the second side of the first resistor 306 is connected to the inverting input of the operational amplifier 304. In some embodiments, the second side of the first resistor 306 is connected to the first side of the second resistor 308. In some embodiments, the second side of the second resistor 308 is connected to the second voltage source 310.

In some embodiments, the LDO regulator 102 comprises the second circuit 204. In some embodiments, the second circuit 204 comprises a sixth switch 604, a seventh switch 606, a third capacitor 608, a fifth voltage source 602 and a sixth voltage source 610. In some embodiments the fifth voltage source 602 is connected to a first side of the seventh switch 606. In some embodiments, a second side of the seventh switch 606 is connected to a first side of the sixth switch 604. In some embodiments, a second side of the sixth switch 604 is connected to the first node 112. In some embodiments, the first side of the sixth switch 604 is connected to a first side of the third capacitor 608. In some embodiments, a second side of the third capacitor 608 is connected to the sixth voltage source 610. In some embodiments, a voltage of the fifth voltage source 602 is substantially equal to a voltage of a supply voltage provided by a power supply operably connected to the fifth voltage source 602. In some embodiments, the voltage of the fifth voltage source 602 is substantially equal to the specified regulator output voltage. In some embodiments, the sixth voltage source 610 is ground. In some embodiments, the sixth switch 604 comprises one or more transistors. In some embodiments, the seventh switch 606 comprises one or more transistors. In some embodiments, the sixth switch 604 is controlled by a sixth control signal. In some embodiments, the seventh switch 606 is controlled by a seventh control signal. In some embodiments, the sixth control signal is controlled by a signal generator. In some embodiments, the seventh control signal is controlled by a signal generator.

In some embodiments, the seventh switch 606 is configured to be activated when the first switch 104 is deactivated. In some embodiments, the fifth voltage source 602 is connected to the first side of the third capacitor 608 when the seventh switch 606 is activated. In some embodiments, when the third capacitor 608 is not fully charged, the third capacitor 608 is configured to be in a charging state until the third capacitor 608 is fully charged, when the seventh switch 606 is activated. In some embodiments, the sixth switch 604 is configured to be activated when the seventh switch 606 is deactivated. In some embodiments, the sixth switch 604 is configured to be deactivated when the seventh switch 606 is activated. In some embodiments, when the sixth switch 604 is activated, the first node 112 is connected to the first side of the third capacitor 608. In some embodiments, the sixth switch 604 is configured to be activated, when the current through the load 108 changes from the first current to the second current, for a period of time. In some embodiments, the sixth switch 604 is configured to be activated, after the first switch 104 changes from the state of deactivation to the state of activation, for the period of time. In some embodiments, the sixth switch 604 is configured to be activated, when the voltage at the first node 112 decreases below the first specified voltage, for the period of time. In some embodiments, the period of time is configured such that the voltage at the first node 112 does not exceed the specified regulator output voltage. In some embodiments, the period of time is less than 10 nanoseconds. In some embodiments, the period of time is configured such that the voltage at the first node 112 exceeds the specified regulator output voltage. In some embodiments, the first circuit 202 is configured to decrease the voltage at the first node 112 when the voltage at the first node 112 exceeds the specified regulator output voltage.

Figure 7:
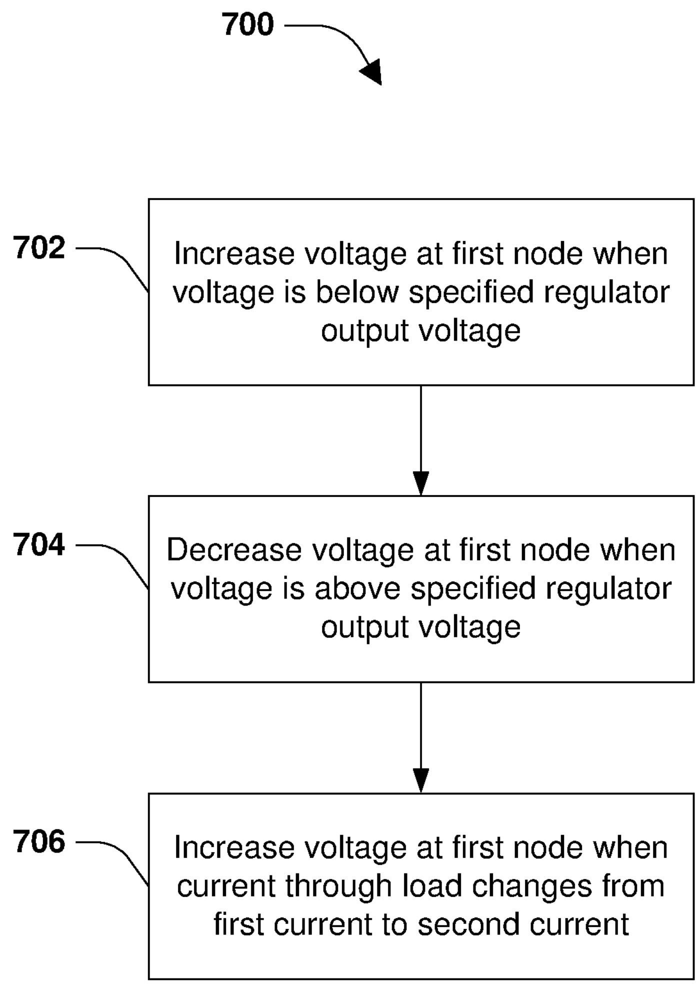
FIG. 7 is an illustration of a flow diagram of a method for operating a low-dropout (LDO) regulator, in accordance with some embodiments.

FIG. 7 illustrates a method 700 for operating an LDO regulator connected to a load. At 702, a first circuit is used to increase a voltage at a first node when the voltage is below a specified regulator output voltage. At 704, the first circuit is used to decrease the voltage at the first node when the voltage is above the specified regulator output voltage. At 706, the second circuit is used to increase the voltage at the first node when a current through the load changes from a first current to a second current. In some embodiments, the first current is less than the second current. In some embodiments, the first current is substantially equal to 0 amperes.

In some embodiments, an LDO regulator is provided. In some embodiments, the LDO regulator comprises a first circuit operating as a closed loop control system. In some embodiments, the first circuit is configured to control a voltage at a first node such that the voltage at the first node is substantially equal to a specified regulator output voltage. In some embodiments, the LDO regulator comprises a second circuit operating as an open loop control system. In some embodiments, the second circuit is configured to increase the voltage at the first node when the voltage at the first node decreases below a first specified voltage.

In some embodiments, an LDO regulator operably connected to a load is provided. In some embodiments, the LDO regulator comprises a first circuit operating as a closed loop control system configured to control a voltage at a first node such that the voltage at the first node is substantially equal to a specified regulator output voltage. In some embodiments, the first node is operably connected to the load. In some embodiments, the LDO regulator comprises a second circuit operating as an open loop control system configured to increase the voltage at the first node when a current flowing through the load changes from a first current to a second current.

In some embodiments, a method for operating an LDO regulator that is connected to a load is provided. In some embodiments, the method comprises using a first circuit to increase a voltage at a first node when the voltage is below a specified regulator output voltage. In some embodiments, the method comprises using the first circuit to decrease the voltage at the first node when the voltage is above the specified regulator output voltage. In some embodiments, the method comprises using a second circuit to increase the voltage at the first node when a current through the load changes from a first current to a second current.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A low-dropout (LDO) regulator, comprising:

a first switch directly, electrically coupled to a first node and between the first node and a load;

a first circuit directly, electrically coupled to the first node and operating as a closed loop control system, the first circuit configured to control a voltage at the first node such that the voltage at the first node is substantially equal to a specified regulator output voltage; and a second circuit directly, electrically coupled to the first node and operating as an open loop control system, wherein:

the second circuit comprises:

a second switch directly, electrically coupled to the first node; and a first capacitor having a first terminal through which the first capacitor is coupled to the first node and a second terminal through which the first capacitor is coupled to a first voltage source, and the second circuit is configured to increase the voltage at the first node when the voltage at the first node decreases below a first specified voltage.

2. The LDO regulator of claim 1, the first circuit comprising an operational amplifier electrically coupled to the first node.

3. The LDO regulator of claim 2, the specified regulator output voltage configured to be a function of a reference voltage at a non-inverting input of the operational amplifier.

4. The LDO regulator of claim 1, the first circuit comprising a first resistor with a first resistance and a second resistor with a second resistance.

5. The LDO regulator of claim 4, the specified regulator output voltage configured to be a function of the first resistance and the second resistance.

6. The LDO regulator of claim 1, the second circuit comprising a third switch electrically coupled between a second voltage source and the second switch.

7. The LDO regulator of claim 6, the second switch and the third switch configured to electrically couple the second voltage source to the first node when the voltage at the first node decreases below the first specified voltage, for a period of time.

8. The LDO regulator of claim 1, comprising a second capacitor electrically coupled to the first node.

9. The LDO regulator of claim 1, the second switch configured to electrically couple the first terminal of the first capacitor to the first node when the voltage at the first node decreases below the first specified voltage, for a period of time.

10. A low-dropout (LDO) regulator electrically coupled to a load, comprising:

a first switch electrically coupled between a first node and the load;

a first capacitor directly, electrically coupled to the first node;

a first circuit directly, electrically coupled to the first node and operating as a closed loop control system, the first circuit configured to control a voltage at the first node electrically coupled to the load such that the voltage at the first node is substantially equal to a specified regulator output voltage; and a second circuit directly, electrically coupled to the first node and operating as an open loop control system, wherein:

the second circuit comprises a second capacitor having a first terminal through which the second capacitor is coupled to the first node and a second terminal through which the second capacitor is coupled to a first voltage source, and the second circuit is configured to increase the voltage at the first node when the first switch is activated to form a current path between the first node and the load.

11. The LDO regulator of claim 10, the first circuit comprising:

an operational amplifier having an output terminal directly, electrically coupled to the first node; and a voltage divider comprising two resistors, wherein an input terminal of the operational amplifier is electrically coupled to a second node between the two resistors.

12. The LDO regulator of claim 10, the second circuit comprising:

a second switch electrically coupled between a second voltage source and the first node, wherein the second switch electrically couples the second voltage source to the first node upon the current path being established between the first node and the load to compensate for a drop in the voltage at the first node caused by the current path being established.

13. The LDO regulator of claim 12, wherein the second voltage source is the second capacitor.

14. The LDO regulator of claim 10, wherein the first voltage source is ground.

15. The LDO regulator of claim 10, the second circuit comprising:

a second switch electrically coupled to the first node and the second capacitor.

16. The LDO regulator of claim 15, the second circuit comprising a third switch directly, electrically coupled between a second voltage source and the second switch.

17. The LDO regulator of claim 16, the third switch directly, electrically coupled to the second capacitor.

18. The LDO regulator of claim 15, comprising:

a third switch electrically coupled between a second voltage source and the first node, wherein the third switch electrically couples the second voltage source to the first node upon the current path being established between the first node and the load to compensate for a drop in the voltage at the first node caused by the current path being established.

19. The LDO regulator of claim 10, the first circuit comprising a first resistor with a first resistance and a second resistor with a second resistance.

20. A method for operating a low-dropout (LDO) regulator electrically coupled to a load comprising:

using a first circuit, directly, electrically coupled to a first node and operating as a closed loop system, to increase a voltage at the first node when the voltage is below a specified regulator output voltage;

using the first circuit to decrease the voltage at the first node when the voltage is above the specified regulator output voltage; and upon a current path being established between the first node and the load using a first switch directly, electrically coupled to the first node and between the first node and the load:

electrically coupling a capacitor to the first node to compensate for a drop in the voltage at the first node caused by the current path being established while a second capacitor is concurrently directly, electrically coupled to the first node, wherein:

a first terminal of the capacitor is coupled to the first node when the capacitor is electrically coupled to the first node and a second terminal of the capacitor is coupled to a voltage source, and the electrically coupling comprises activating a second switch directly, electrically coupled to the first node and between the first node and the capacitor.

* * * * *